United States Patent [19]
Itoh

[11] Patent Number: 4,884,014
[45] Date of Patent: Nov. 28, 1989

[54] POSITION CONTROL METHOD
[75] Inventor: Hiroshi Itoh, Numazu, Japan
[73] Assignee: Toshiba Machine Co., Ltd., Tokyo, Japan
[21] Appl. No.: 174,963
[22] Filed: Mar. 29, 1988
[30] Foreign Application Priority Data
Mar. 30, 1987 [JP] Japan .................. 62-79216
[51] Int. Cl.⁴ .......................... G05B 19/29
[52] U.S. Cl. .................. 318/600; 318/570; 318/632; 364/474.28; 364/167.01
[58] Field of Search ........ 318/600, 570, 632; 364/474

[56] References Cited
U.S. PATENT DOCUMENTS
4,206,393 6/1980 Chiba .................. 318/632
4,514,813 4/1985 Nozawa et al. .......... 364/474

Primary Examiner—William M. Shoop, Jr.
Assistant Examiner—Saul M. Bergmann
Attorney, Agent, or Firm—Cushman, Darby & Cushman

[57] ABSTRACT

A position control method for controlling a position of an object on a machine tool such as a lathe having a plurality of axes. The control on one of the axes is conducted in accordance with a control input signal which is generated in response to a position command signal and a state variable for each axis so as to optimize an evaluation function J, wherein the control input signal $U_i$ is generated so as to optimize the evaluation function in such a manner as to reduce path error by taking into account not only the position command signal and the state variable concerning this axes but also the position command signal and the state variable concerning another axis.

7 Claims, 7 Drawing Sheets

POSITION CONTROL METHOD

BACKGROUND OF THE INVENTION

1. Field of the Invention

The present invention relates to a system having a plurality of axes oriented in different directions such as a machine tool. More particularly, the present invention is concerned with a position control method which is used in a system of the type described and which can minimize the path error while attaining high response velocity and control stability.

2. Related Art

Figure 7:
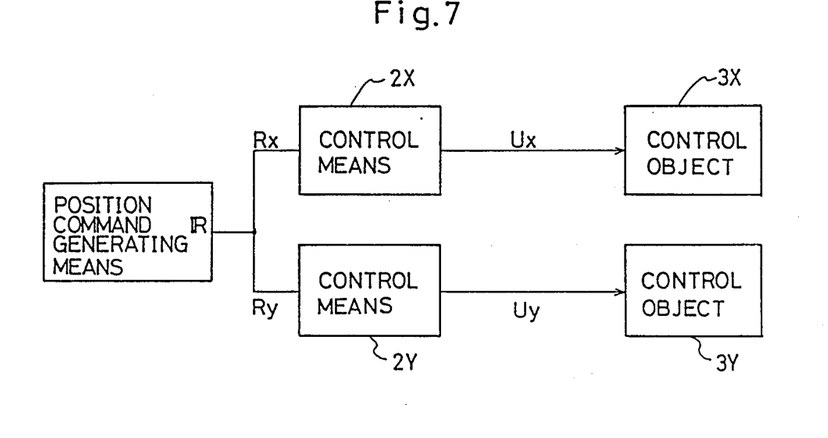
FIG. 7 is a block diagram of a known position control apparatus.
Figure 8:
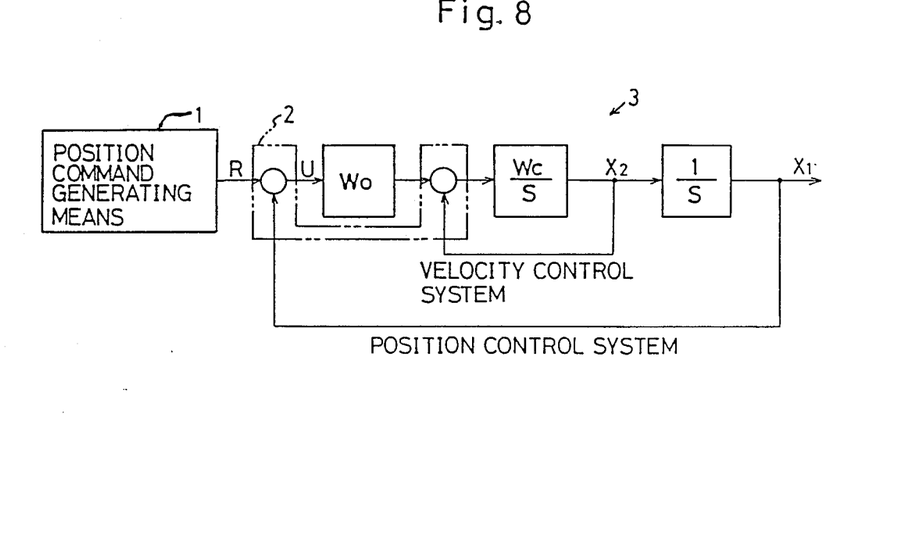
FIG. 8 is a block diagram of a control system incorporated in the apparatus shown in FIG. 7.

A typical conventional position control method in a system of the type described relies upon a so-called soft servo system shown in FIG. 8 conducted on each of a plurality of axes. FIG. 7 shows an example of a position control system for controlling the position of an object along a circular path. The system illustrated in FIG. 7 basically employs position controls along two axes. Namely, the system shown in FIG. 7 has a position command generating means 1 capable of outputting a shape (position) command signal R ($R_x$, $R_y$) and control means 2X, 2Y which receive the command values $R_x$, $R_y$ of the components of the respective axes and delilver control inputs $U_x$, $U_y$ to the control objects 3X, 3Y having the respective driving means. In operation, the control means 2X, 2Y of the respective axes, upon receipt of the respective command values $R_x$, $R_y$ from the position command generating means 1, operate to simultaneously control the corresponding control objects 3X, 3Y, whereby a circular path is formed.

FIG. 8 shows, for the purpose of clarification and simplicity of explanation, the detail of the position control system for uni-axial position control. This system employs an outer control loop of a comparatively low level gain ($\omega_o$) intended for controlling the position and an inner control loop of a comparatively high level gain ($\omega_c$) intended for controlling velocity.

The velocity control loop, which has a higher level of gain ($\omega_c$) exhibits a greater stability against any disturbance and fluctuation of parameters. In addition, since the position control loop has a comparatively low level of gain ($\omega_o$), there is no risk of imparting excessive impact (acceleration) to the mechanical system. For these reasons, the known system shown in FIGS. 7 and 8 offers an advantage in that no specific consideration is needed in the formation of the machining or processing program when this sytem is applied to, for example, a numerical control machine tool.

This known position control system however, still suffers from the following problems.

Namely, this known system does not enable the response speed and the stability of the system to be adjusted independently. Thus, the system is often required to operate under such a compromise that either one or both of the response speed and the stability do not reach the required level. Even if such a compromise could be obtained, the known system still encounters a problem in that much labor and time are required for the purpose of comparison of the instant value with the command value. Furthermore, a critical problem encountered with this known system is that the precision of the position control is undesirably limited by the maximum value of the gain ($\omega_o$) of the position control loop.

This critical problem, which is serious particularly from the view point of current demand for higher accuracy or precision, will be described in more detail.

The characteristic (G(s)) of the position control loop in the position control system shown in FIG. 8 can be handled as a servo having a first-order lag, because the gain ($\omega_c$) of the velocity control loop is greater than the gain ($\omega_o$) of the position control loop. For example, the gain ($\omega_c$) of the velocity control loop is usually 4 to 20 times greater than the gain ($\omega_o$) of the position control loop. The characteristic (G(s)) therefore is represented as follows.

$$G_{(s)} = \frac{\omega_o}{S + \omega_o} \tag{1}$$

On the other hand, the response characteristic V(t) to a stepped velocity command ($V_0/S$) is represented as follows.

$$V_{(t)} = V_o(1 - e^P) \tag{2}$$

where, P represents $-\omega_o t$.

Therefore, the acceleration $a_{(t)}$ required can be obtained as follows, by conducting a first order differentiation of the formula (2) as follows.

$$a_{(t)} = V_o \cdot \omega_o \cdot e^P \tag{3}$$

A machine system which may be a machine tool is assumed here to have a maximum cutting feed velocity $V_0$ max. In such a system, the maximum acceleration a max is given by the following formula (4).

$$a_{max} = V_o \, max \cdot \omega_o \tag{4}$$

On the other hand, the machine system itself has an allowable maximum acceleration A max which is determined by the construction thereof. Obviously, the condition of a max $\leq$ A max has to be met. Therefore, the maximum value $\omega_0$ max was of the gain of the position control loop is limited by the following condition.

$$\omega_o \, max = A_{max}/V_o \, max \tag{5}$$

The shape precision during cutting of a circular work is represented here in terms of a radius reduction rate $\delta$ of the circle. The radius reduction rate $\delta$ is represented as follows.

$$\delta = \frac{\Delta R}{R} = \left\{1 + \left(\frac{V_o}{2\pi R \omega_o}\right)^{\frac{1}{2}} - 1\right\} \approx \frac{1}{2}\left(\frac{V_o}{2\pi R \omega_o}\right)^2 \tag{6}$$

Where, R represents the radius (mm) of the diameter, while $\Delta R$ represents the decrement (mm) of the radius. $V_0$ represents the cutting velocity (mm/sec).

When a circle of a radius R is scribed at a constant cutting velocity $V_0$, the radius reduction rate $\delta$ is proportional to $1/\omega_o^2$, i.e., varies in inverse proportion to $\omega_o^2$. On the other hand, the maximum value $\omega_0$ max of the gain of the position control loop is limited due to the reason concerning the machine system, as explained before in connection with formula (5). Thus, in a position control system which is approximated by the formula (1), the upper limit of the maximum value $\omega_0$ max of the gain is determined by the allowable maximum acceleration Amax and the maximum cutting feed velocity $V_0$max which are determined by the machine system. Therefore, when the factors (Amax, $V_0$max) of the machine system are definitely determined, the maximum gain $\omega_0$max is automatically limited, thus making it impossible to obtain a higher gain. In consequence, the precision 8 is limited by the maximum value $\omega_0$max of the gain, thus preventing attainment of any higher degree of precision.

The known position control method explained before in connection with FIG. 7 involves another problem. Namely, in this system, a single position command generating means 1 is adapted for conducting a machining along a circular path by conducting bi-axial position control, i.e., a position control in the direction of a first axis and a position control in the direction of a second axis. To this end, the position command generating means outputs command values $R_x$ and $R_y$ for the respective directions or axes, so that the respective control means 2X and 2Y operate so as to control the conrol systems 3X and 3Y on the basis of the commands $R_x$ and $R_y$. Therefore, the position control by the system shown in FIG. 7 essentially requires that two control groups each consisting of the control means 2X or 2Y and the control system 3X or 3Y, have exactly the same mechanical and electrical characteristics, otherwise the control may be effected such that one of the shafts moves ahead while the other runs aback in response to the commands, resulting in an error in the determination of the path.

SUMMARY OF THE INVENTION

Accordingly, an object of the present invention is to provide a position control method suitable for use in a machine system of the type described above, wherein controls of positions along a plurality of axes are mutually associated so as to improve the shape precision of the product, while improving both the stability and response velocity of the system, thereby overcoming the problems of the art.

To this end, according to the present invention, there is provided a position control method in which an evaluation function J are optimized in accordance with a principle of optimality so as to afford a predictive characteristic for each axis control, which conducting the adjustment of mutual interference between different axes, thereby to improve the shape precision while minimizing the path error.

More specifically, an optimal control system is achieved by designing such that it outputs a control input $U_i$ in response to a command value $r$, while optimizing (maximizing or minimizing) the evaluation function J.

The present application has already proposed a method for attaining a high degree of control precision while improving the stability and response characteristic of a system. More specifically, in the proposed method, the values of weight coefficients in accordance with the principle of optimality are suitably varied in accordance with the state of the system rather than being fixed, or, alternatively, the transfer function of the whole system is varied while the factors of the mechanical system are kept unchanged, whereby the predictive characteristics are remarkably improved. The applicant, however, considers that the proposed method are still unsatisfactory when used in a system in which controls are performed simultaneously in the directions of a plurality of axes.

For instance, it is assumed here that a curve such as a circle is scribed by effecting controls simultaneously in the directions of two axes. The position command is represented by $r$ (k+j), where, j=1, 2, ..., M, while the path C to be followed by the machine system (servo system) is represented by C. In such a case, the shape precision can be evaluated through judging whether two curves coincide each other in the region between K and K+M. More specifically, it is judged that the shape precision is high, when these two curves coincide with each other. Unfortunately, however, path errors have been inevitably caused in the known control system because the controls of position along different axes are performed independently, without mutual interaction.

According to the present invention, the sum of areal elements formed between both curves is used as an index of the path error, and the optimality evaluation by the evaluation function J is conducted while effecting a mutual compensation beteen the controls along two axes in such a manner that the sum of the areal elements approaches zero.

Figure 3:
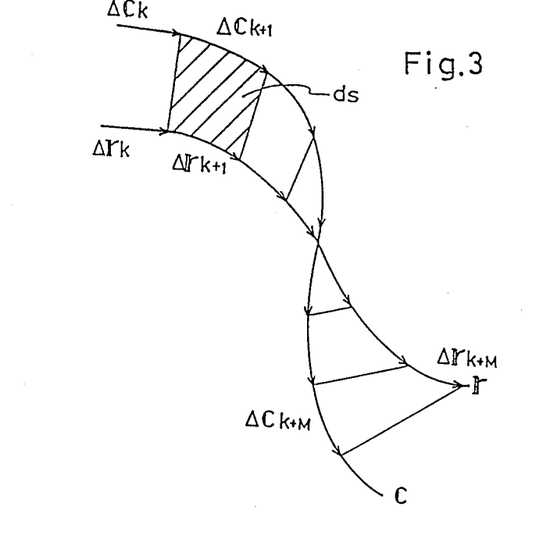
FIG. 3 is an illustration of a path of position control illustrating the concept of an areal element.
Figure 4:
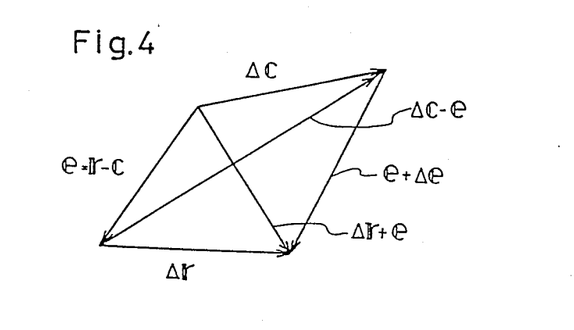
FIG. 4 is an illustration of the relationship between vectors defining the areal element.

FIG. 3 illustrates the concept of areal element of a section or region, while FIG. 4 shows the vectors representing the areal elements.

The areal element ds is represented as follows:

$$ds = \frac{1}{2} | e \times \Delta r | + \frac{1}{2} | \Delta C \times (\Delta r + e ) |$$

$$= \frac{1}{2} | e \times \Delta C | + \frac{1}{2} | \Delta r (e + \Delta e) |$$

where, "×" represents the exterior product, $r$ represents the position command vector, C represents the position vector, and $e (=r-C)$ represents the position error vector.

An improvement in the shape precision can be achieved by introducing all or some of the terms defining the areal element ds into the evaluation function J and then optionally evaluating the same. As will be understood from the above, the term to be introduced is one or more of $(e \times \Delta r)$, $[\Delta C \times (\Delta r + e)]$, $(e \times C)$ and $[\Delta r \times (e-e)]$. From a viewpoint of processing the whole evaluation function, the term to be introduced preferably is a square of one of these terms, e.g., $(e \times \Delta r)^2$. The term also may be differentiated forms of these terms, e.g., $[e \times (\dot{r}dt)]$, $(e \times \dot{r}$, $[e \times (\dot{C}dt)]$, $(e \times \dot{C})$, $[(\dot{C}dt) \times (\dot{r}dt + e)]$ and $[\dot{C} \times (\dot{r}dt + e)]$, as well as squares of these differentiated terms.

Figure 1:
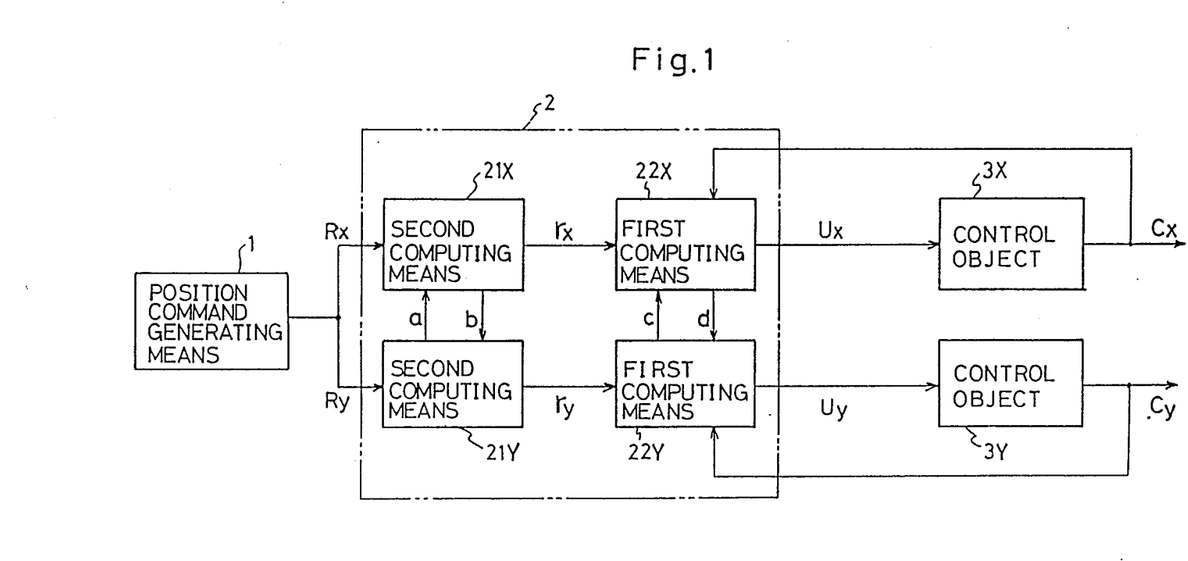
FIG. 1 is a block diagram showing the detail of the construction of a position control system suitable for carrying out the position control method in accordance with the present invention.
Figure 2:
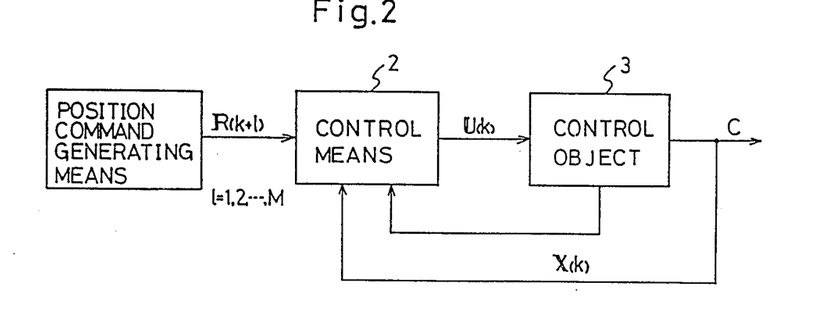
FIG. 2 is a schematic block diagram of the control system.

FIG. 1 is a block diagram of the system shown in FIG. 2. As will be seen from FIG. 1, the whole control system includes a position (shape) command generating means 1 and a control means 2 which is composed of a second computing means 21X and 21Y for converting the commands Rx and Ry for the respective axes X and Y into corresponding intermediate signals $r_x$, $r_y$, and first computing means 22X and 22Y for outputting the respective control inputs $U_x$ and $U_y$. The control for each axis can be carried out by optimizing the evaluation function of each system by effecting mutual compensation between two axes, by making use of not only the command value $R_x(R_y)$ state variable $C_x (C_y)$ of the axis but also those $R_y(R_x)$ and $C_y(C_x)$ of the other axis.

Although the values of the weight coefficients may be varied as described before, these values are maintained constant in this embodiment. If the term U corresponding to the acceleration and the areal element are selected to be $(e \times \Delta r)$ or $(e \times \Delta r)^2$ for the purpose of preventing the acceleration of the control object 3(3X, 3Y, . . . ) from becoming excessively large, such a term becomes zero during linear movement so that the evaluation function J takes the minimal value even when there is no movement in the mechanical system. In order to obviate such a problem, in this embodiment, a term including the position error component is introduced in the form of a square of a second order.

Namely, according to the invention, the evaluation function J, now expressed as J(t), t being time is represented as follows in the form of integration through a region between the present moment t and a future moment $t_M$.

$$J_{(t)} = \int_t^{t+t_M} \{(e \times \dot{c})^2 + qe^2 + hU^2\}d\tau \qquad (7)$$

As discussed above, to improve shape precision, $(e \times \dot{c})^2$ may be substituted by a square of the above-mentioned terms such as $(e \times \ddot{c})^2$.

In formula (7) above, the symbols respectively represent the following factors.

$\dot{c} = (\dot{c}_x, \dot{c}_y)$ . . . increment of position command vector
$e = c_- C = (e_x, e_y)$ . . . position error vector
$U = (U_x, U_y)$ . . . control input vector
$C = (C_x, C_y)$ . . . position vector
$\dot{X} = AX + BU$
$C = DX$ where,
X: state variable
A: coefficient matrix of control object
B: input matrix
D: output matrix.

It is therefore possible to reduce the path error by solving the J of the formula (7) together with $C_{x(t)}$ and $C_{y(t)}$ by, for example, DP (Dynamic programming) method so as to determine $U_x$ and $U_y$ and then substituting the determined values of $U_x$ and $U_y$ to the control objects 3X and 3Y. In order to determine the values of $U_x$ and $U_y$, it is necessary to exchange, between the second computing means 21X, 21Y and the first computing means 22X, 22Y, the command values $R_x$, $R_y$ and state amounts $C_x$ and $C_y$ as indicated by arrows (a, b, c, d) in FIG. 1.

A control equivalent to that explained in connection with the formula (7) can be conducted by a evaluation function J which employs factors such as the vector of the state change of the system and including also the weight coefficient H in accordance with the principle of optimality. More specificlly, in this case, the evaluation function is expressed as follows.

$$J = \qquad (8)$$
$$\int_t^{t+t_M} \{(X^T(\tau) \cdot Q_1 (\tau - t) \cdot X)^2 + X^T(\tau) \cdot Q(\tau - t) \cdot X + U^T(\tau) \cdot H(\tau - t) \cdot U(\tau)\}d\tau$$

Thus, the first term of the right side of the formula is a square term.

The evaluation function where expressed by difference calculus form, is written as follows.

$$J_i = \qquad (9)$$
$$\sum_{j=k}^{k+M} ((X^T(j) \cdot Q_1 (j - k) \cdot X(j))^2 + X^T(j) \cdot Q(j - k) \cdot X(j) + T(j-1) \cdot H(j-k) \cdot U(j-1))$$

where,
X: state variable vector of system $(n \times 1)$
Q: positive semi-definite symmetric matrix $(n \times n)$
U: control input vector $(m \times 1)$
H: positive definite symmetric matrix $(m \times m)$
T: sampling time.

Thus, the method of the present invention employs an evaluation function as expressed by one of the preceding formulae (7) to (9) or an evaluation function having a evaluation term of areal element such as $(e \times \dot{c})^2$ and the command values and the state amounts for the controls on both axes are exchanged so as to optimize the evaluation function, by an arrangement shown in FIG. 1.

Thus, according to the present invention, an evaluation function J which provides a predictive characteristic is used. The evaluation function has a term relating to an areal element which enables the path error to be reduced through exchange of the command values and state amounts (variable of states) between the controls conducted on both axes, so that the shape precision is remarkably improved while simultaneously satisfying both the demand for a high stability of the system and the requirement for a good response characteristic.

DETAILED DESCRIPTION OF THE PREFERRED EMBODIMENT

Preferred embodiments of the invention will be described with reference to the accompanying drawings.

It is to be noted that the embodiments described in this specification are carried out by a position control system as shown in FIG. 1.

Thus, the description will be made on an assumption that the positions are controlled in the directions of two axes. It is also to be noted that the position control in the following embodiments is executed by employing the evaluation function J (more specifically $J_{i(t)}$) of the formula (7). It is also to be noted that the control object has a construction as shown by a block diagram of FIG. 8.

(FIRST EMBODIMENT)

Figure 5A:
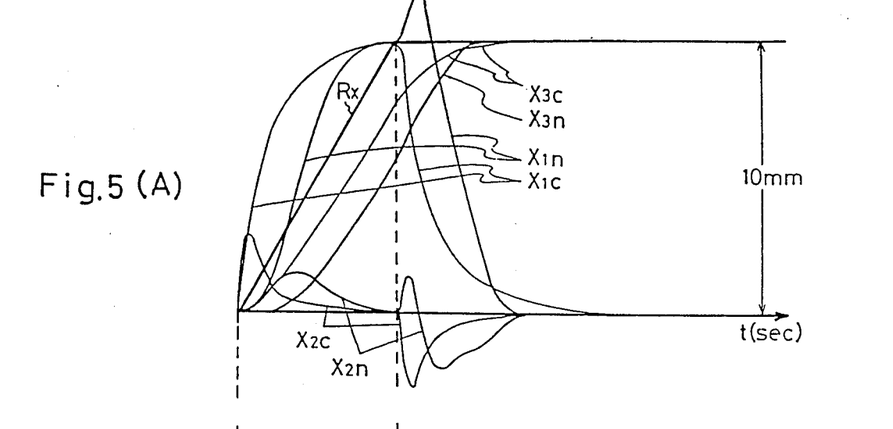
FIG. 5A is a time chart illustrating the control operation of an X-axis control system during scribing of a corner.
Figures 5B, 5C:
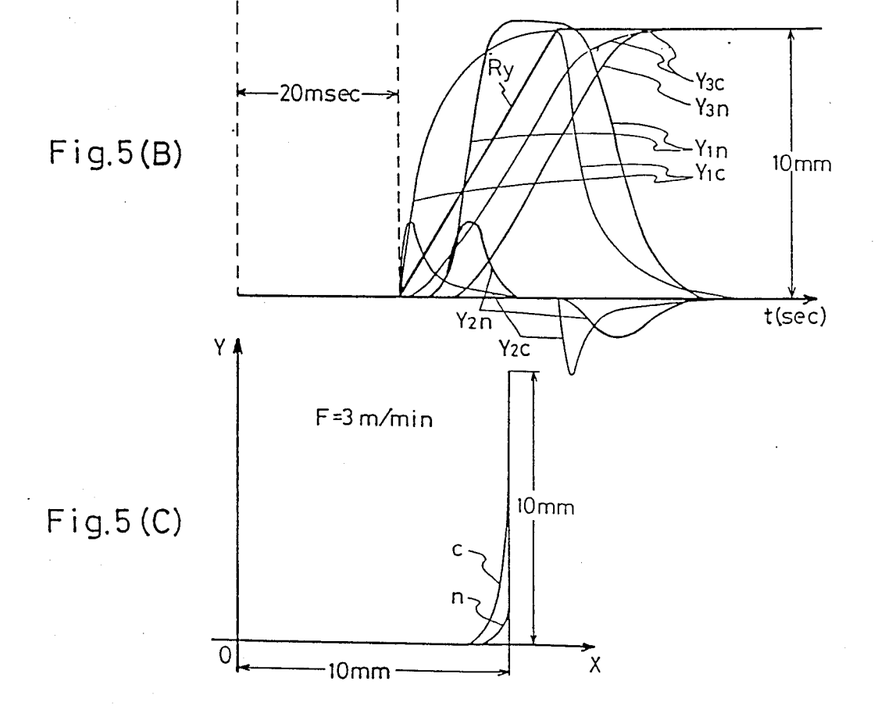
FIG. 5B is a time chart illustrating the control operation of a Y-axis control system during scribing of a corner.
FIG. 5C is an enlarged view of the scribed corner.

In FIGS. 5A to 5C, suffixes c and n are used to represent characteristics such as X- and Y-axes feed velocity, accelerations and positions as obtained by a conventional method (c) and a novel control method (n) embodying the present invention, when these control methods are used in scribing a corner. It is to be noted that the conventional method relies upon a mere soft servo system which is known per se, while the control method of the invention has a predictive characteristic and is intended for reducing the path error.

Referring first to FIG. 5A, the conventional control system has a large peak of acceleration value $X_2$ in response to a X-axis command which rises in the form of a ramp (tapered form) value $R_x$, whereas the acceleration $X_{2n}$ obtained through the control by the present invention does not have such a large peak but is maintained within an allowable region. It will also be seen that the rise of the velocity $X_{1n}$ is much steeper as compared with that $X_{1c}$ produced by the conventional method. Thus, the system n of the present invention has a predictive characteristic so that the control method of the invention enables the X-axis position $X_{3n}$ in response to the command $R_x$ to reach the command value (10 mm) before the X-axis position $X_{3c}$ by the conventional control method reaches the command value (10 mm). Thus, the control method of the invention provides a higher response speed as compared with the conventional method, and provides a higher stability as will be realized by a comparatively flat curve of the acceleration $X_{2n}$.

As will be understood from a comparison between the characteristics shown in FIGS. 5A and 5B, the conventional system employs independent controls for the X-axis control and Y-axis control. According to the conventional method, therefore, the velocity $Y_{1c}$, acceleration $Y_{2c}$ and position $Y_{3c}$ as obtained in the Y-axis control as shown in FIG. 5B are substantially the same as those $X_{1c}$, $X_{2c}$ and $X_{3c}$ obtained in the X-axis control shown in FIG. 5A. In other words, the conventional control method provides the same level of response both in the X-axis control and the Y-axis control. In contrast, according to the control method n of the invention, the Y-axis control is conducted by using predictive characteristic as in the case of the X-axis control and, at the same time, the evaluation function is minimized by making use of the command $R_x$ and the state variable $C_x$ for the X-axis control, thereby minimizing the path error. Therefore, the velocity $Y_{1n}$ rises more steeply than the velocity $X_{1n}$ so that a further speed-up or improvement in the response can be achieved by making an efficient use of the movement in the direction of the X-axis. This will be clearly realized from a comparison between the absolute value of the acceleration $Y_{2n}$ and the absolute value of the acceleration $X_{2n}$. It is, however, to be understood that the absolute value of the acceleration $Y_{2n}$ is substantially the same as that of the acceleration $X_{2c}$. The time requires for the analysis of the evaluation function $J_i$ is sec to be 200 m sec. As a result, the shape error can be remarkably reduced when the feed velocity F is set to be 3 m/min as shown in FIG. 5C.

(SECOND EMBODIMENT)

Figure 6:
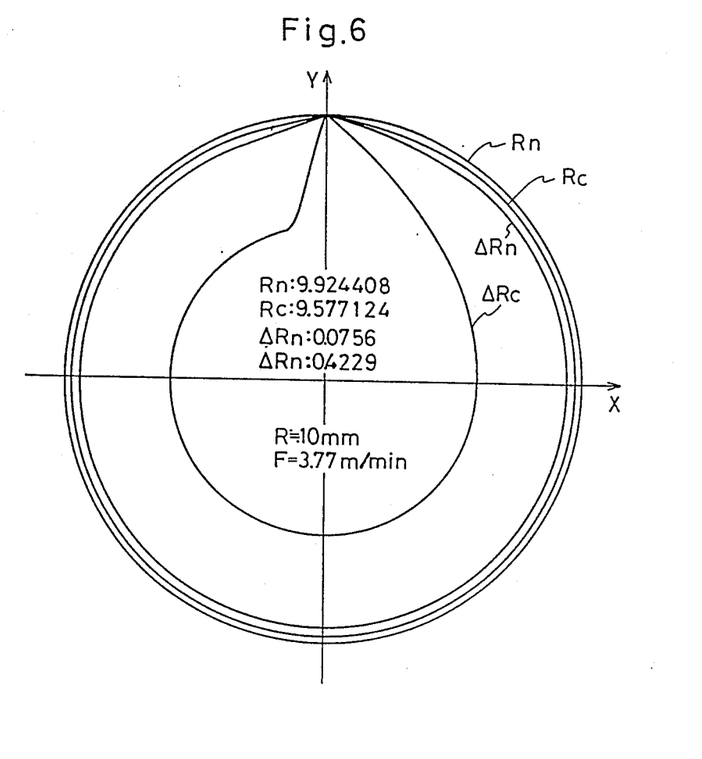
FIG. 6 is a chart illustrating the path of control for scribing a circle.

The second embodiment employs the same evaluation function and system arrangement as those of the first embodiment but is applied for controlling an object along a circular path. As will be seen from FIG. 6, thus control method n of the invention provides a radius reduction $\Delta R_n$ of about 76 μm which is much smaller than that $\Delta R_c$ of about 423 μm. Thus, the control method of the invention offers a precision which is about 5 to 6 times as high as that obtained with the conventional control method. The command radius is 10 mm, while the feed velocity was 3.77 m/min. At the same time, the position loop gain ($\omega_o$) was set to be 20 rad/sec.

In this embodiment, the controls on a plurality of axes are simultaneously conducted in such a manner that the control inputs $U_1$ ($U_{x(t)}$, $U_{y(t)}$) for the controls on the respective axes which would optimize the evaluation function J which encompasses (Jx, Jy) are generated in accordance with the position commands $R_i$ ($R_{x(t)}$, $R_{y(k)}$) and the state variables $X_i$ ($C_{x(t)}$, $C_{y(t)}$) for the controls on the respective axes, wherein the control input $U_i$ for the control on one of the axes, e.g., X-axis, is determined such as to optimize the evaluation function J so as to minimize the path error, taking into account not only the position command signal $R_{x(i)}$, (i=1,2 . . . M) and the state variable $X_j(C_{x(i)})$ (j=1,2 . . . M) for the control on this x axis (X) but also the position command signal $R_k$ ($R_y$) and the state variable $X_k$ ($C_y$) for the control on the other axis, e.g., the Y-axis. It is therefore possible to remarkably improve the shape (position) accuracy while achieving both a high stability and response characteristic, even with the construction and the maximum acceleration of the machine system are unchanged.

In addition, the evaluation function J employs an evaluation term which reduces the path error with the square of the second order form as shown in formula (7). In consequence, the computation and evaluation are facilitated and, at the same time, a control suitable for a machine system having reciprocal part, e.g., a machine tool, can be conducted.

The areal element for minimizing the path error, appearing in formula (7), may be either (e×r) or (e×ΔC) as described before, or may be any other element selected from the group of mathematical element equivalent thereto. it will be seen that, by suitably selecting the type of the areal element, the invention can be more readily carried out in such a manner as to cope with different types and/or the conditions of use of the machine system.

In addition, since the evaluation function J is determined by integration through a definite region, it is possible to attain a further increase in the control speed, as well as a further improvement in the positional precision. In addition, the control method offers a practical advantage in that, since the control means 2 can be constituted by a computer, the method can be carried out without requiring any modification in an existing machine system, simply by an alteration of the program.

Although the evaluation function J shown by the formula (7) has been specifically mentioned, the evaluation function J as shown by the formula (8) may be used equally well. Thus, the evaluation function expressed by the formula (8) provides high response velocity and precision equivalent to those offered when the evaluation shown by the formula (7) is used.

It is also to be noted that the control method of the invention can generally be applied to a machine system having a plurality of control axes, e.g., three of more, although a bi-axial control has been specifically mentioned in the description of the embodiments.

As will be understood from the foregoing description, the control method of invention employs the evaluation function J which is determined to have a predictive characteristic and ability to reduce the path error, thus ensuring a high degree of precision of the shape control, as well high stability and response speed of the system.

What is claimed is:

1. A position control method for controlling a position simultaneously along a plurality of i axes, comprising the steps of
controlling said position on an $i^{th}$ axis in accordance with a control input signal $U_i$ which is generated in response to a position command signal $R_i$ and a state variable $X_i$ for each axis produced on the basis of a position command signal in such a manner as to optimize an evaluation function J; and
generating said control input signal $U_i$ so as to optimize said evaluation function J in such a manner as to reduce a path error by taking into account both the position command signal $R_i$ and the state variable $X_i$ for said $i^{th}$ axis and also a position command signal $R_k$ and the state variable $X_j$ for another axis j.

2. A position control method according to claim 1, wherein said evaluation function J includes a term of a square of a second order form, in order to reduce said path error.

3. A position control method according to claim 2, wherein said evaluation function J includes one of the following elements or elements mathematically equivalent thereto:
$(e \times \Delta r)$, $\Delta c \times (\Delta + e)$, $(e \times \Delta c)$ and $\Delta r \times (e + \Delta e)$; and differentiated forms of these elements expressed by $e \times (\dot{r}dt)$, $e \times \dot{r}$, $e \times (\dot{c}dt)$, $e \times \dot{c}$, $(\dot{c}dt) \times (\dot{r}dt + e)$ and $\dot{r} \times (e + \dot{e}dt)$; where,
x: external product
r: position command vector
c: position vector
e = r−c: position error vector.

4. A position control method according to claim 2, wherein said evaluation function J is determined in the form of an integration of said term throughout a definite time period between an instant moment t and a future moment $t_M$.

5. A position control method according to claim 4, wherein said i axes includes two axes X and Y, and said evaluation function J is given by the following formula:

$$J = \int_{t}^{t+t_M} \{ (e \times \dot{r})^2 + q e^2 + h U^2 \} d\tau$$

where,
$\dot{r} = (\dot{r}_x, \dot{r}_y)$ : position command vector
$e = \dot{r} - c = (e_x, e_y)$ : position error vector
$U = (U_x, U_y)$ : control input vector
$c = (C_x, C_y)$ : position vector
$\dot{X} = AX + BU$
$c = DX$
where,
X: state variable
A: coefficient matrix of control object
B: input matrix
D: output matrix
wherein "x" of $(e \times \dot{r})^2$ represents exterior product.

6. A position control method according to claim 4, wherein said evaluation function J is expressed by the following formula:

$$\int_{t}^{t+t_M} \{ (X^T(\tau) Q(\tau - t) \cdot X)^2 + X^T(\tau) \cdot Q(\tau - t) \cdot X + U^T(\tau) \cdot H(\tau - t) \cdot U(\tau) \} d\tau$$

where,
X : state variable vector of system (n×1)
Q: positive semi-definite symmetric matrix (n×n)
H: positive definite symmetric matrix (m×m).

7. A position control method according to claim 4, wherein said evaluation function J is expressed by the following formula:

$$\int_{t}^{t+t_M} \{ (r(\tau) - X(\tau))^T Q(\tau - t)(R(\tau) - X(\tau)) + U^T(\tau) H(\tau - t) U(\tau) \} d\tau$$

where,
X: state variable vector of system (n×1)
Q: positive semi-definite symetric matrix (n×n)
H: positive definite symmetric matrix (m×m).

* * * * *